US012797967B2

(12) United States Patent
Oka et al.

(10) Patent No.: US 12,797,967 B2
(45) Date of Patent: Nov. 17, 2026

(54) CUTTING MACHINE

(71) Applicant: HONDA MOTOR CO., LTD., Tokyo (JP)

(72) Inventors: Keiichiro Oka, Tokyo (JP); Shimpei Matsumoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 247 days.

(21) Appl. No.: 18/850,591

(22) PCT Filed: Mar. 30, 2022

(86) PCT No.: PCT/JP2022/016033
§ 371 (c)(1),
(2) Date: Sep. 25, 2024

(87) PCT Pub. No.: WO2023/188119
PCT Pub. Date: Oct. 5, 2023

(65) Prior Publication Data

US 2025/0214152 A1 Jul. 3, 2025

(51) Int. Cl.
*B23B 41/12* (2006.01)
*B23B 29/04* (2006.01)

(52) U.S. Cl.
CPC ............ *B23B 41/12* (2013.01); *B23B 29/043* (2013.01)

(58) Field of Classification Search
CPC ....... B23B 41/12; B23B 29/043; B23B 49/00; B23B 49/02
See application file for complete search history.

(56) References Cited

U.S. PATENT DOCUMENTS 4,132,494 A * 1/1979 Aldridge, Jr. ............ B23Q 1/56 408/54
4,701,081 A * 10/1987 Hashimoto .......... B23Q 7/1426 408/54
4,842,450 A * 6/1989 Donovan ................ B23B 29/02 408/1 R

FOREIGN PATENT DOCUMENTS

| | | |
|---|---|---|
| JP | 58-079131 | 5/1983 |
| JP | 62-166909 | 7/1987 |
| JP | 62166909 A * | 7/1987 |
| JP | 05-002442 | 1/1993 |
| JP | 5002442 B * | 1/1993 |
| JP | 2016-129938 | 7/2016 |

(Continued)

OTHER PUBLICATIONS

International Search Report and Written Opinion for International Application No. PCT/JP2022/016033 mailed on May 24, 2022, 9 pages.

*Primary Examiner* — Bayan Salone
(74) *Attorney, Agent, or Firm* — Amin, Turocy & Watson, LLP

(57) ABSTRACT

A cutting machine is provided with, at a distal end of a tool, a key protrusion that has a tapered section. The distal end of the tool can be inserted into an insertion hole of a bushing. The insertion hole is provided with a key groove into which the key protrusion is inserted. The tapered section of the key protrusion has first and second inclined surfaces. The first inclined surface is a surface twisted clockwise with respect to the axial center of the tool. The second inclined surface is a surface twisted counterclockwise with respect to the axial center of the tool. A tapered groove section of the key groove has first and second guide surfaces.

3 Claims, 10 Drawing Sheets

(56) References Cited

FOREIGN PATENT DOCUMENTS

JP 2016129938 A * 7/2016

* cited by examiner

CUTTING MACHINE

TECHNICAL FIELD

The present invention relates to a cutting machine that uses a cutting tool and thereby carries out machining on a workpiece.

BACKGROUND ART

The present applicant has proposed a cutting machine that is used for boring or honing (refer to JP H05-002442 B2). This cutting machine carries out machining on bearing holes in a cylinder block, which is a workpiece.

The cutting machine is equipped with a support column, a drive mechanism, a feed mechanism, four tool heads, tools (boring bars), four support jigs, a workpiece support mechanism, and a transport mechanism.

The support column is erected on a base. A machining station is installed on the base. The drive mechanism is disposed at a position corresponding to the machining station so as to be capable of ascending and descending. The drive mechanism and the tool heads are raised and lowered along the support column by the feed mechanism. The tools are connected in an attachable and detachable manner to the respective tool heads. The tools extend downwardly from the tool heads. The support jigs are disposed at a position corresponding to the machining station. The support jigs are fixed to a lower part of the support column.

In such a cutting machine, a workpiece is transported by the transport mechanism to a position corresponding to the machining station, and is retained by the support jig. A motor of the feed mechanism is driven, thereby causing the drive mechanism, the tool heads, and the tools to be lowered along the support column. Accompanying the lowering of the tools, lower end parts of the tools are inserted into insertion holes provided in bushes (bearings) of a rotation support unit. By the drive mechanism being driven, the tools rotate and are inserted into bearing holes of the workpiece. Cutting edges of the tools carry out machining of the bearing holes of the workpiece. After the machining of the bearing holes of the workpiece is completed, the feed mechanism is driven to thereby cause the tools to be raised. After the workpiece has been released from the support jig, the workpiece is transported from the machining station by the transport mechanism.

In the above-described cutting machine, in the case that a variation has occurred in the phases in the direction of rotation when outer circumferential parts of lower ends of the tools and inner circumferential parts of the bushes engage, or alternatively, in the case that slippage occurs in an intervening gap where the members are mutually engaged and relative rotation has occurred between the members, a problem arises in that the rotational accuracy of the tools will deteriorate within a tolerance range of the respective cylindricities. As a means for causing the phases in the direction of rotation to coincide when the outer circumferential parts of the lower ends of the tools and the inner circumferential parts of the bushes engage, it may be considered to provide key grooves in the bushes, and to provide movable keys in the lower end parts of the tools. A method is generally used in which, at a time when the tools are lowered and engage with the bushes, the movable keys retract, and thereafter, when the tools are rotated and the phases of the movable keys of the tools and the key grooves of the bushes coincide, the movable keys project out and the movable keys and the key grooves are made to engage. In accordance with this feature, it is possible to cause the phases in the direction of rotation between the lower end parts of the tools and the bushes to coincide.

However, in the case that the movable keys are provided at the lower end parts of the tools, there is a concern in that cutting chips, which are generated by the cutting machine, may enter into the moving portions of the movable keys, thus causing the movable keys not to operate properly. When the distal ends of the tools that are provided with fixed movable keys are inserted into the interior of the bushes with key grooves that are out of phase, a problem arises in that the movable keys and the bushes interfere with each other.

SUMMARY OF THE INVENTION

The present invention has the object of solving the aforementioned problem.

An aspect of the present invention is characterized by a cutting machine, comprising: a main body frame; a tool that has a shaft shape, is linearly movably disposed along the main body frame, and is driven to rotate; and a rotation support unit including a rotating body provided with an insertion hole into which a distal end part of the tool along a direction of movement is inserted, wherein the rotating body is configured to rotate together with the tool that is inserted into the insertion hole, wherein the tool is inserted into the insertion hole by moving in a first direction along an axial direction of the tool, an engaging convex portion, which projects outwardly in a radial direction of the tool and extends along the axial direction of the tool, is provided on the distal end part of the tool, the insertion hole extends along the axial direction of the rotating body, and includes an engagement groove recessed from an inner circumferential surface of the insertion hole and outwardly in a radial direction of the insertion hole, the engaging convex portion being inserted into the engagement groove, the engaging convex portion includes: a convex portion main body formed with a substantially constant width along the axial direction of the tool; and a tapered portion disposed adjacent to the convex portion main body in the first direction and including first and second inclined surfaces, a distance between which becomes smaller toward the first direction, when the tool is viewed in the first direction, the first inclined surface is disposed in a counterclockwise direction with respect to a center in a widthwise direction of the tapered portion, and the second inclined surface is disposed in a clockwise direction with respect to the center in the widthwise direction of the tapered portion, the first inclined surface is a surface that is twisted clockwise with respect to an axial center of the tool toward the first direction, and the second inclined surface is a surface that is twisted counterclockwise with respect to the axial center of the tool toward the first direction, the rotating body includes an end surface facing toward a second direction that is a direction opposite to the first direction, the engagement groove includes: a tapered groove portion extending in the first direction from the end surface of the rotating body and including first and second guide surfaces, a distance between which becomes smaller toward the first direction, the tapered groove portion having a greater width than the tapered portion; and a groove main body disposed adjacent to the tapered groove portion in the first direction, and formed with a substantially constant width along the axial direction of the rotating body, when the insertion hole is viewed in the first direction, the first guide surface is disposed in the counterclockwise direction with respect to a center in a widthwise direction of the engagement groove, and the second guide surface is disposed in the clockwise direction with respect to the center in the widthwise direction of the engagement groove, and the first guide surface is a surface that is twisted clockwise with respect to an axial center of the insertion hole toward the first direction, and the second guide surface is a surface that is twisted counterclockwise with respect to the axial center of the insertion hole toward the first direction.

According to the present invention, the following advantageous effects can be obtained.

More specifically, the tool is moved in the first direction along the main body frame, and the engaging convex portion, which is provided at the distal end of the tool, is inserted into the engagement groove of the insertion hole in the rotating body. At this time, the first inclined surface is a surface that is twisted clockwise with respect to the axial center of the tool toward the first direction, and the second inclined surface is a surface that is twisted counterclockwise with respect to the axial center of the tool toward the first direction. The first guide surface is a surface that is twisted clockwise with respect to the axial center of the insertion hole toward the first direction, and the second guide surface is a surface that is twisted counterclockwise with respect to the axial center of the insertion hole toward the first direction.

Therefore, when the engaging convex portion is inserted into the engagement groove in a state in which the engaging convex portion and the engagement groove are shifted clockwise or counterclockwise, either the first inclined surface and the first guide surface, or alternatively, the second inclined surface and the second guide surface can come into surface contact with each other via their twisted curved surfaces to the degree of phase shift in the direction of rotation.

Accordingly, when the tool moves in the first direction in a state in which the first inclined surface and the first guide surface are in surface contact, or alternatively, in a state in which the second inclined surface and the second guide surface are in surface contact, the rotating body rotates in following relation with the tool, in a manner so that the center in the widthwise direction of the engagement groove faces toward the center in the widthwise direction of the engaging convex portion. The center in the widthwise direction of the engagement groove and the center in the widthwise direction of the engaging convex portion coincide, and the convex portion main body of the engaging convex portion is inserted into the groove main body of the engagement groove.

As a result, by causing the tool to be lowered and inserting the engaging convex portion into the engagement groove of the rotating body, either the first inclined surface and the first guide surface, or alternatively, the second inclined surface and the second guide surface, come into surface contact with each other, thereby making it easy to quickly and smoothly align the phases of the tool and the rotating body in the direction of rotation. Consequently, since the phases of the tool and the bush can be aligned simultaneously with the insertion of the tool, the operation time period required to cause the tool to rotate and to carry out machining of the workpiece can be reduced. Since the engaging convex portion is fixed to the distal end part of the tool, an operation malfunction does not occur caused by machining chips that are generated by the cutting machine, and the engaging convex portion can always be stably inserted into the engagement groove, and thus the phases of the tool and the rotating body in the direction of rotation can be aligned. Further, regardless of the amount of phase shift of the bush, by always maintaining the surface contact between either the first inclined surface and the first guide surface, or alternatively, the second inclined surface and the second guide surface, stable use is possible without the occurrence of abnormal wear and abrasion.

DETAILED DESCRIPTION OF THE INVENTION

Figure 1:
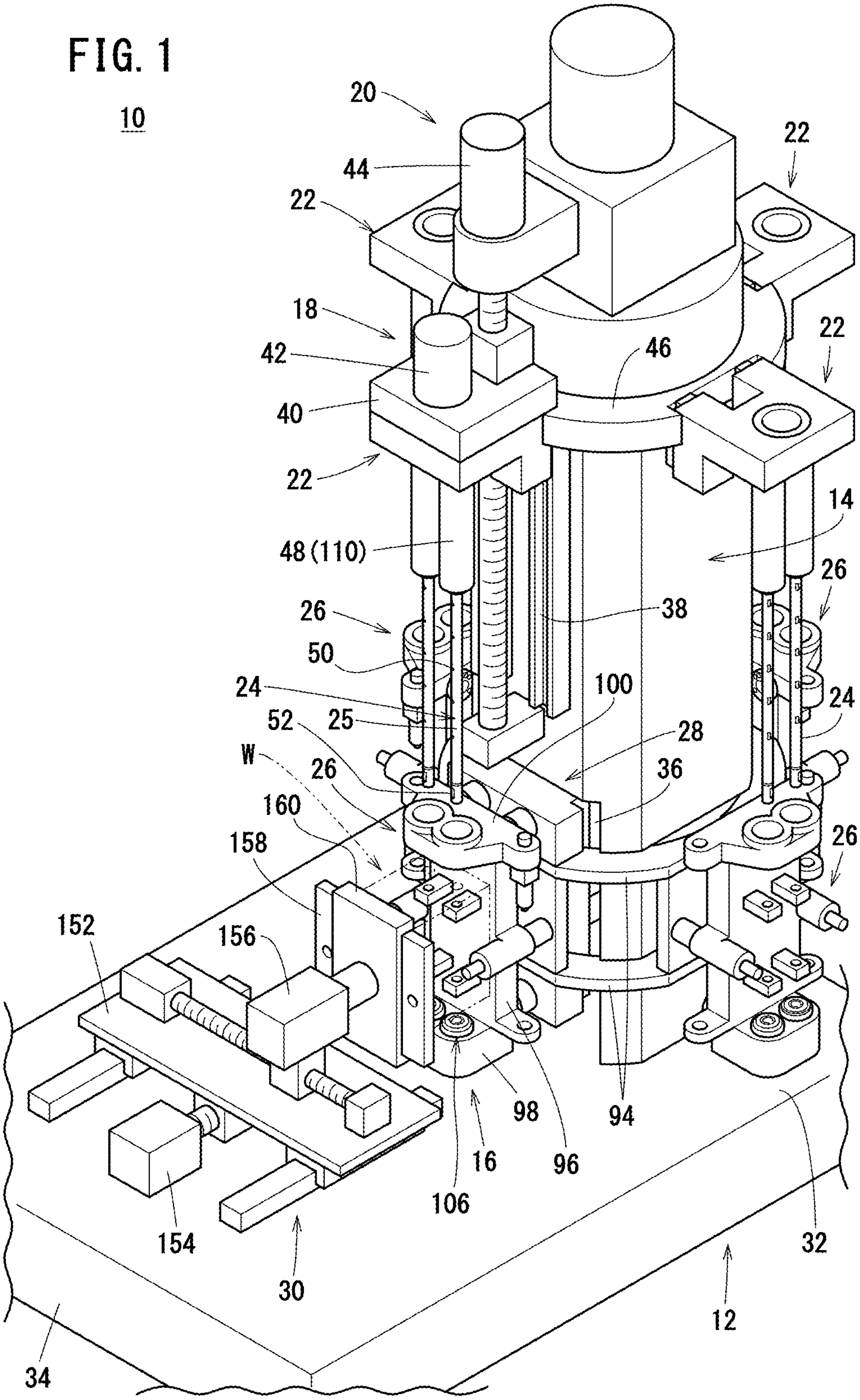
FIG. 1 is an external perspective view of a cutting machine according to an embodiment of the present invention.
Figure 2:
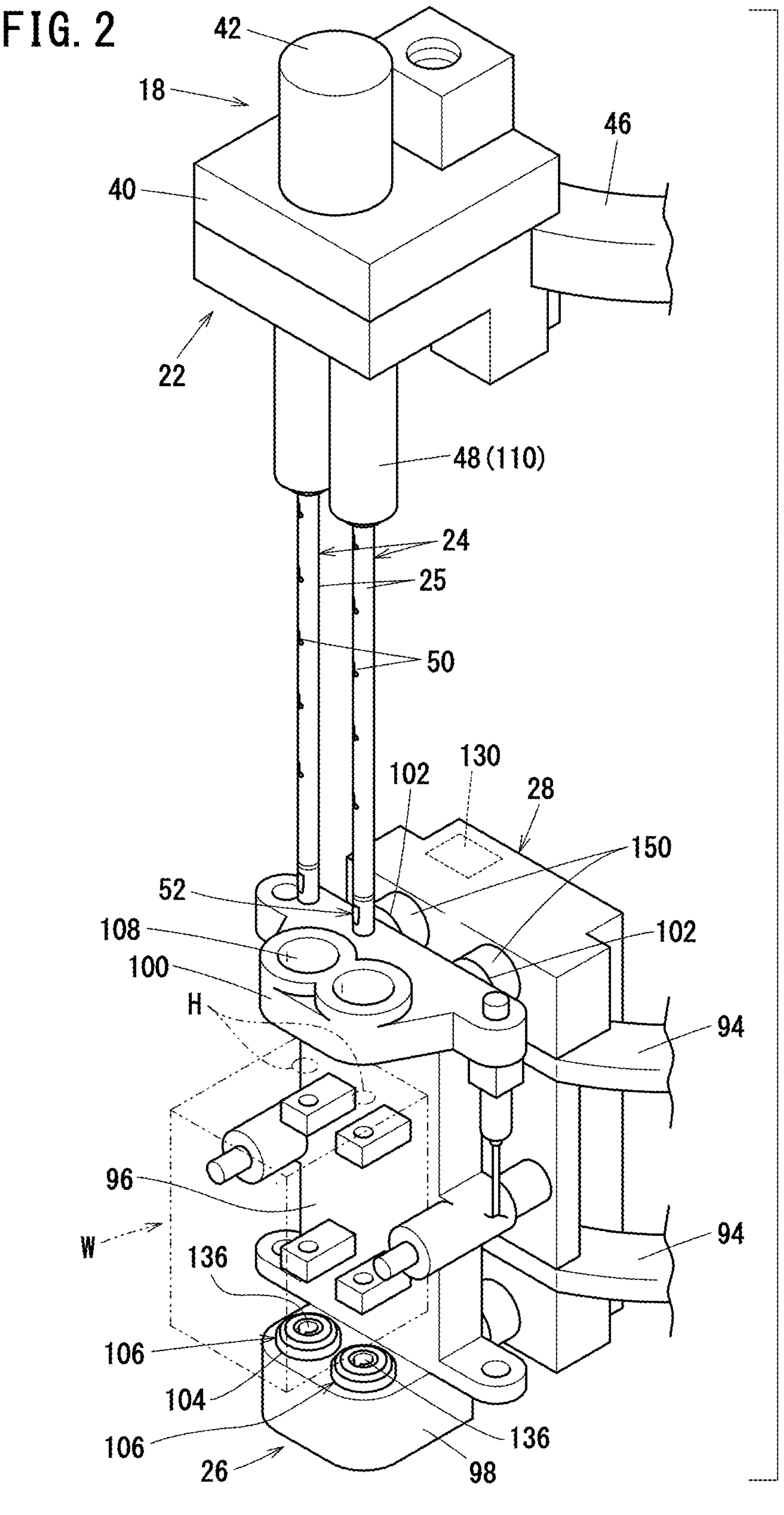
FIG. 2 is an enlarged perspective view of essential portions of the cutting machine shown in FIG. 1.

A cutting machine 10 is used in order to carry out machining of holes in a workpiece W. The workpiece W is a cylinder block and a cylinder head of an internal combustion engine that is mounted in a vehicle. As shown in FIG. 1 and FIG. 2, the cutting machine 10 is equipped with a foundation 12, a main body frame 14, a machining station 16, a drive mechanism 18, a feed mechanism 20, four tool heads 22, tools 24, jigs 26, a support block 28, and a transport mechanism 30.

The foundation 12 is disposed in a lower part of the cutting machine 10. The foundation 12 extends in the horizontal direction. The foundation 12 is placed on a floor surface or the like. The foundation 12 is equipped with a first base 32 and a second base 34. The main body frame 14 is connected to an upper part of the first base 32. The second base 34 is adjacent to the first base 32. The transport mechanism 30, which will be described later, is disposed on an upper part of the second base 34.

The main body frame 14 stands upwardly from the upper part of the first base 32 of the foundation 12. The main body frame 14 includes an accommodation space 36 and a guide rail 38.

The accommodation space 36 opens on the outer circumferential surface of the main body frame 14. The accommodation space 36 faces toward the machining station 16 and the transport mechanism 30, which will be described later. The support block 28, which will be described later, is accommodated in the interior of the accommodation space 36.

The guide rail 38 is disposed on the outer circumferential surface of the main body frame 14. The guide rail 38 is disposed on an upper part of the accommodation space 36. The guide rail 38 extends along the axial direction of the main body frame 14.

The machining station 16 is a site where the workpiece W is subjected to machining. The machining station 16 is disposed on a lateral side of the main body frame 14. The machining station 16 faces toward a lower part of the main body frame 14. The workpiece W is transported in and transported out of the machining station 16 by the transport mechanism 30.

The drive mechanism 18 is disposed on an upper part of the main body frame 14. A portion of the drive mechanism 18 projects outwardly in a radial direction from the main body frame 14. The drive mechanism 18 is disposed upwardly of the machining station 16. The drive mechanism 18 and the machining station 16 face toward each other in an upper/lower direction. The drive mechanism 18 is equipped with a lifting platform 40 and a drive motor 42.

The lifting platform 40 is disposed horizontally and orthogonally to an axial line of the main body frame 14. The lifting platform 40 is capable of moving along the guide rail 38 of the main body frame 14. The drive motor 42 is fixed to an upper part of the lifting platform 40. The drive motor 42 includes drive shafts (not shown). Rotating shafts 48 of the tool heads 22 are connected to lower ends of the drive shafts. By electrical power being applied to the drive motor 42 from a non-illustrated electrical power source, the rotating shafts 48 rotate together with the drive shafts.

The feed mechanism 20 is capable of moving the drive mechanism 18 including the lifting platform 40 up and down in the upper/lower direction. The feed mechanism 20 is disposed on the upper part of the main body frame 14. The feed mechanism 20 is equipped with a lifting motor 44. By driving the lifting motor 44, the lifting platform 40 moves up and down in the upper/lower direction along the guide rail 38.

The four tool heads 22 are arranged on the outer circumference of the main body frame 14. The four tool heads 22 are retained on a head carrier 46. The head carrier 46 has an annular shape. The head carrier 46 is disposed radially outward from the outer circumferential surface of the main body frame 14. The head carrier 46 is disposed to be capable of rotating on the main body frame 14. The four tool heads 22 are arranged at equal intervals in the circumferential direction of the head carrier 46. When viewed from the axial direction of the head carrier 46, the four tool heads 22 are spaced apart from one another by 90 degrees.

By the head carrier 46 being rotated by the driving force of a non-illustrated drive source, the four tool heads 22 rotate around the main body frame 14. The four tool heads 22 rotate along the outer circumferential surface of the main body frame 14, and one tool head 22 of the four tool heads 22 is disposed at a position that faces toward the machining station 16.

Each of the tool heads 22 is equipped with the rotating shafts 48. The rotating shafts 48 are supported to be capable of rotating on the tool heads 22. The rotating shafts 48 extend downwardly (in a first direction) from the tool heads 22. Upper ends of the rotating shafts 48 are connected to the lower ends of the drive shafts of the drive motor 42 in the drive mechanism 18. Lower ends of the rotating shafts 48 are connected to the upper ends of the tools 24 via non-illustrated joints.

The tools 24 are disposed in an attachable and detachable manner on the tool heads 22. The tools 24 have a shaft shape that is elongated along the axial direction. The tools 24 extend downwardly (in a second direction) from the tool heads 22. The tools 24 are equipped with tool shafts 25, a plurality of bits 50, and adapters 52.

The bits 50 are cutting tools having cutting portions at distal ends thereof. The bits 50 are disposed in a direction that is orthogonal to the axial lines of the tool shafts 25. The bits 50 are inserted into retaining holes (not shown) provided in the tool shafts 25. The distal ends of the bits 50 project outwardly in a radial direction from the outer circumferential surfaces of the tools 24 (the tool shafts 25). The plurality of bits 50 are arranged at equal intervals along the axial direction of the tools 24. Cutting machining is carried out by the distal ends of the bits 50 on the inner circumferential surfaces of machined holes H (refer to FIG. 2) in the workpiece W.

Upper ends of the tools 24 (the tool shafts 25) are capable of being connected to lower ends of the rotating shafts 48. When the drive motor 42 rotates, the tools 24 rotate along with the rotating shafts 48. Lower ends of the tools 24 can be inserted into first rotation support units 106 of the jigs 26, which will be described later.

Figure 3:
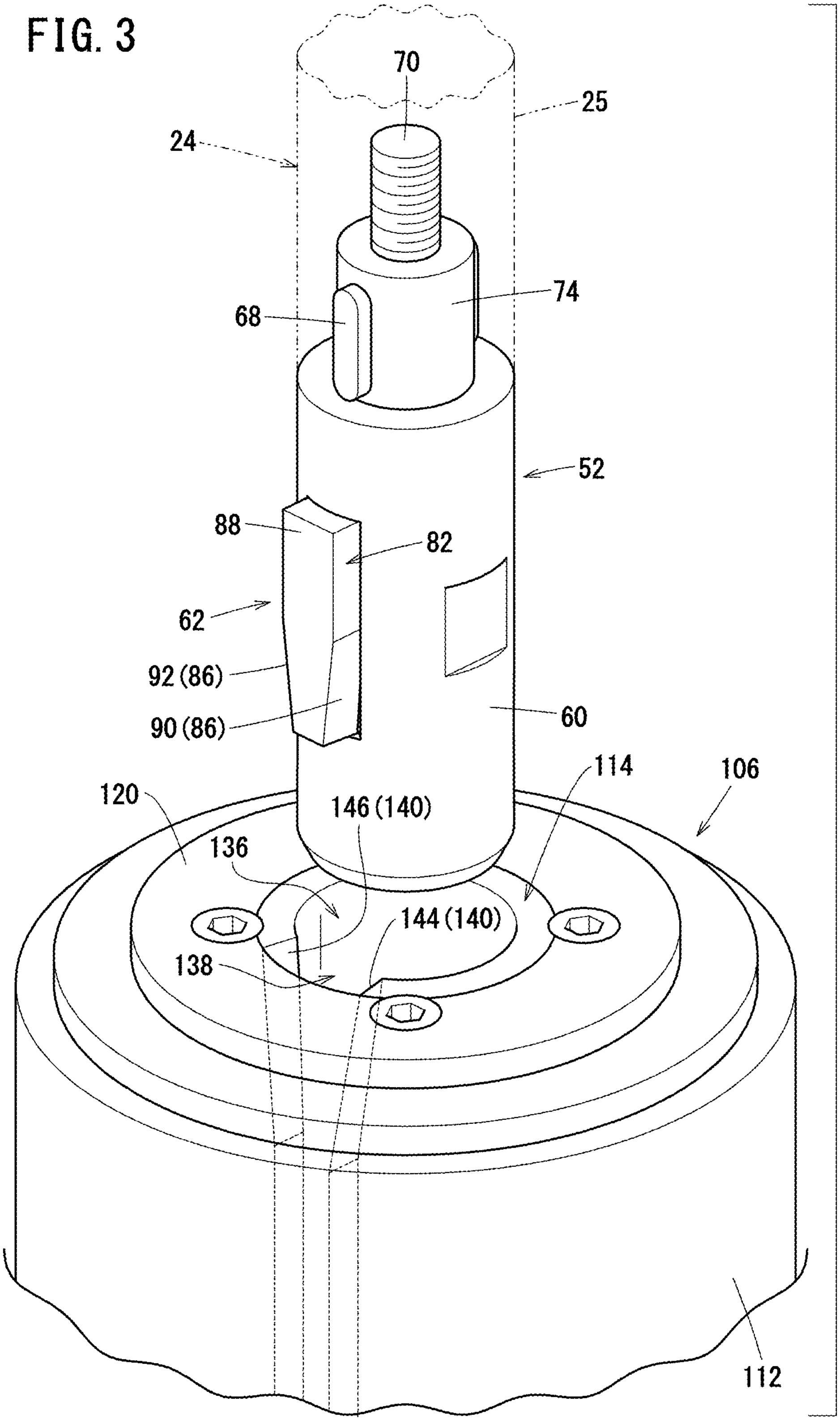
FIG. 3 is an enlarged perspective view showing a vicinity of a distal end of a tool and a first rotation support unit in the cutting machine shown in FIG. 1.
Figure 4:
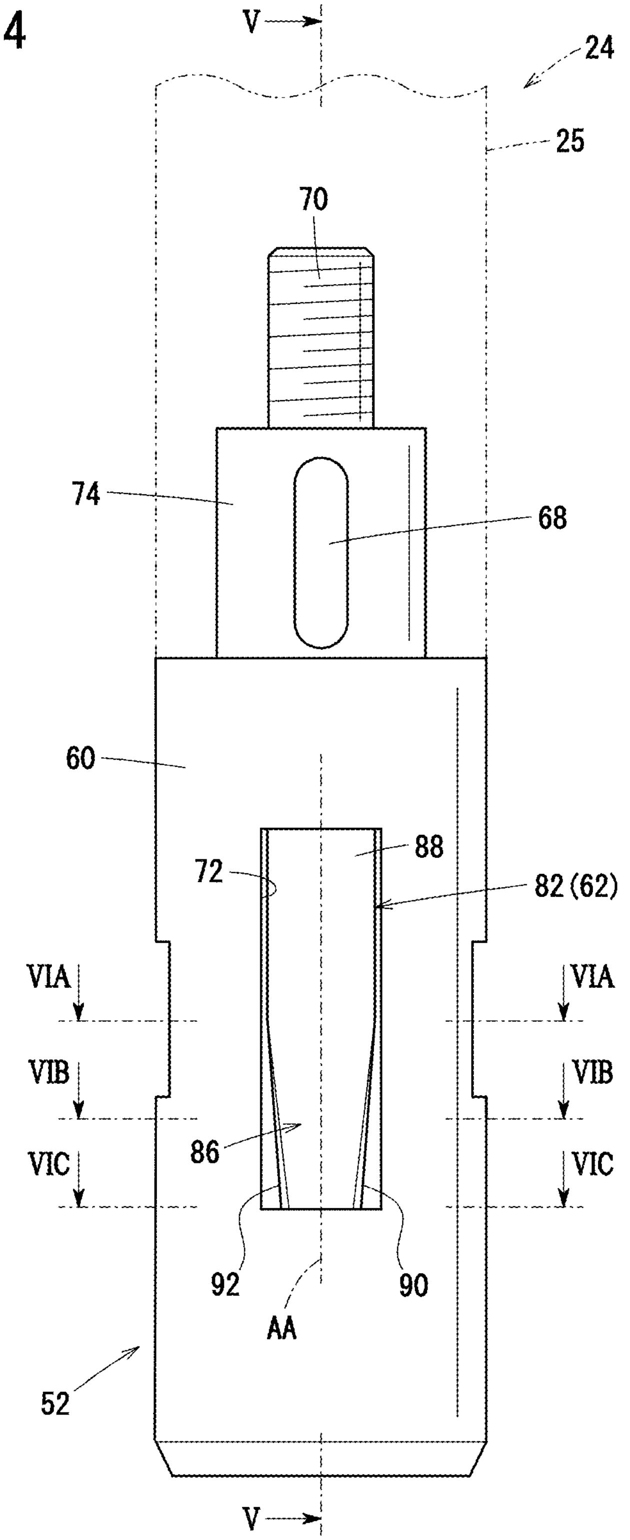
FIG. 4 is an enlarged front view showing the distal end of the tool and an adapter.
Figure 5:
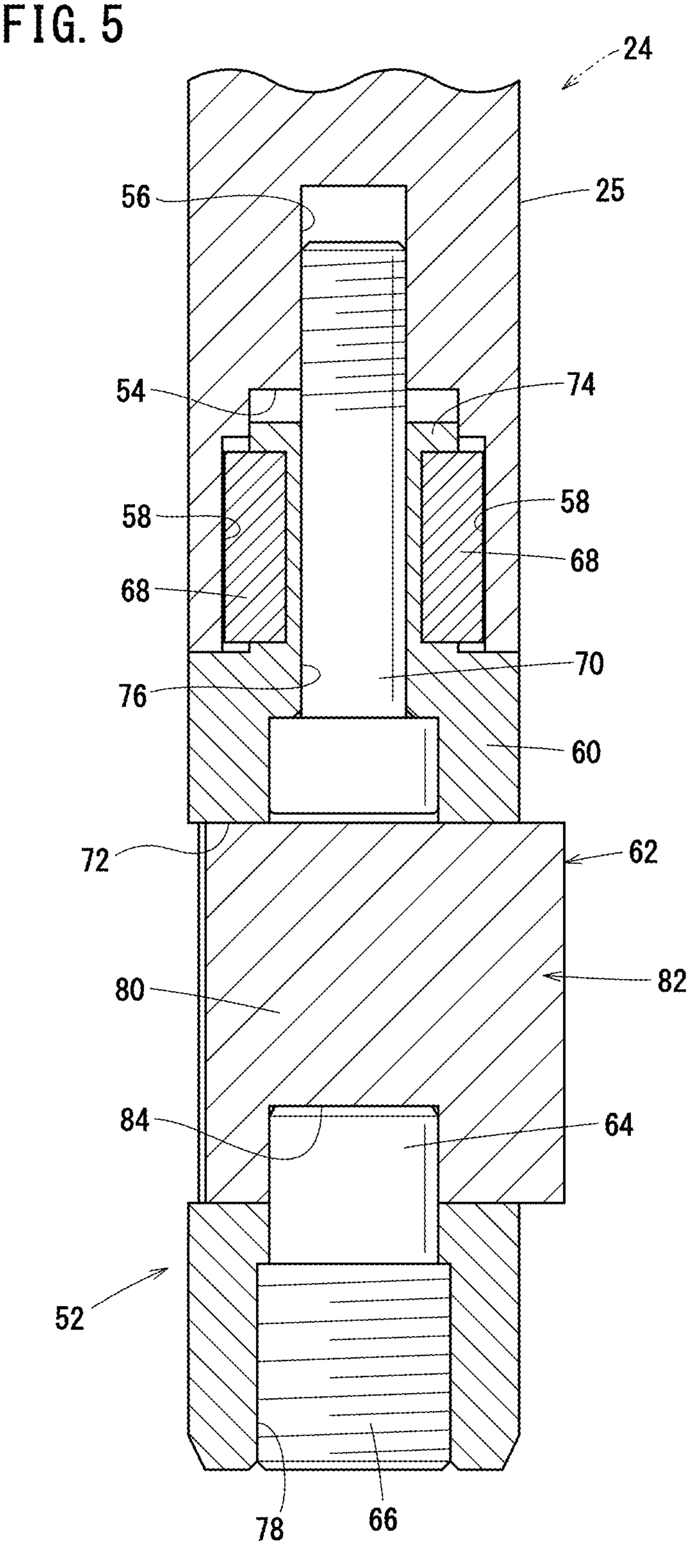
FIG. 5 is a cross-sectional view taken along line V-V of FIG. 4.

As shown in FIG. 3 to FIG. 5, lower ends (distal end parts) of the tool shafts 25 include mounting holes 54 therein. The mounting holes 54 open downwardly. Insertion members 74 of the adapters 52 are inserted into the mounting holes 54. The tool shafts 25 include threaded holes 56 at upper ends of the mounting holes 54. The threaded holes 56 are arranged at the centers of the mounting holes 54. The threaded holes 56 extend upwardly (in the second direction) beyond the upper ends of the mounting holes 54. When viewed from the axial direction of the tools 24, the inner circumferential surfaces of the mounting holes 54 are circular shaped. The inner circumferential surfaces of the mounting holes 54 include pairs of slit grooves 58 therein. The slit grooves 58 are recessed radially outward from the inner circumferential surfaces of the mounting holes 54. The slit grooves 58 extend along the axial direction of the mounting holes 54.

The adapters 52 are connected to lower ends of the tool shafts 25. The adapters 52 are disposed in an attachable and detachable manner on the tool shafts 25. The adapters 52 are equipped with bodies 60, key members 62, plug members 64, nut members 66, pairs of rotation-preventing members 68, and connecting bolts 70. When the tools 24 are lowered, the adapters 52 are capable of being inserted into the first rotation support units 106 together with the tools 24.

The bodies 60 are cylindrically shaped. The outer diameters of the bodies 60 are approximately the same as the outer diameters of the tools 24. The bodies 60 are equipped with accommodation holes 72 and the insertion members 74. The accommodation holes 72 are disposed approximately at the center along the axial direction of the bodies 60.

The accommodation holes 72 penetrate through the bodies 60 in a direction orthogonal to the axial direction. The accommodation holes 72 are capable of accommodating the key members 62 therein. When viewed from a direction orthogonal to the axial direction of the bodies 60, the cross-sectional shape of the accommodation holes 72 is a rectangular shape that is elongated in the axial direction. The accommodation holes 72 open on the outer circumferential surfaces of the bodies 60.

The insertion members 74 are disposed on the upper ends of the bodies 60. The insertion members 74 are smaller in diameter than the bodies 60. The insertion members 74 are capable of being inserted into the mounting holes 54 of the tools 24. The pairs of the rotation-preventing members 68 are installed in the insertion members 74. By being mounted in the insertion members 74, the rotation-preventing members 68 project radially outward beyond the outer circumferential surfaces of the insertion members 74.

The rotation-preventing members 68 extend along the axial direction of the insertion members 74. When the insertion members 74 are inserted into the mounting holes 54, the pairs of rotation-preventing members 68 are inserted respectively into the slit grooves 58. Consequently, the tools 24 and the adapters 52 are prevented from rotating. The adapters 52 do not rotate relatively with respect to the tools 24.

Bolt holes 76 and set screw holes 78 are included in the interior of the bodies 60. The bolt holes 76 and the set screw holes 78 are disposed respectively on the axial lines of the bodies 60.

The connecting bolts 70 are capable of being inserted into the bolt holes 76. The bolt holes 76 are disposed at positions that are in closer proximity to the insertion members 74 than the accommodation holes 72. The bolt holes 76 open into and communicate with the accommodation holes 72. The bolt holes 76 extend from the bodies 60 to the insertion members 74. The bolt holes 76 open on upper ends of the insertion members 74. When the insertion members 74 are inserted into the mounting holes 54 of the tools 24, the connecting bolts 70 that are inserted into the bolt holes 76 are screw-engaged in the threaded holes 56. In accordance with this feature, the adapters 52 are fixed by the connecting bolts 70 to the lower ends of the tools 24.

The set screw holes 78 penetrate from the lower ends of the bodies 60 to the accommodation holes 72. The plug members 64 and the nut members 66 are accommodated in the set screw holes 78. The plug members 64 are disposed in the set screw holes 78 at positions that are in closer proximity to the accommodation holes 72. The nut members 66 are disposed in the set screw holes 78 at positions that are in closer proximity to the lower ends of the bodies 60 that are spaced apart from the accommodation holes 72.

In a state in which the plug members 64 are inserted into the set screw holes 78, the nut members 66 are screw-engaged in the set screw holes 78 from the lower ends of the bodies 60. Consequently, the set screw holes 78 are closed by the nut members 66. In the set screw holes 78, upper parts of the plug members 64 project out into the interior of the accommodation holes 72. By the upper parts of the plug members 64 being engaged in concave portions 84 of the key members 62, which will be described later, it is possible to determine the positions of the key members 62 in the radial direction.

The key members 62 serve as block bodies. The key members 62 are equipped with key main bodies 80, and key convex portions (engaging convex portions) 82. The cross-sectional shape of the key main bodies 80 is a substantially rectangular shape. The key main bodies 80 have a shape corresponding to the accommodation holes 72 of the bodies 60. Lower ends of the key main bodies 80 are equipped with the concave portions 84. When the key members 62 are viewed from below, the cross-sectional shape of the concave portions 84 is a circular shape with a portion thereof being cut out (refer to FIG. 6A to FIG. 6C). The cross-sectional shape of the concave portions 84 corresponds to the plug members 64. When the key members 62 are inserted into the accommodation holes 72, the concave portions 84 face toward the set screw holes 78. The upper parts of the plug members 64 are inserted into the concave portions 84. By the plug members 64 being inserted into the concave portions 84, the movement of the key members 62 along the accommodation holes 72 is restricted. The key members 62 are fixed in the accommodation holes 72 by the plug members 64.

According to the present configuration, a configuration is provided so that, as will be described later, when the key convex portions 82 are inserted into key grooves 138, the load applied therefrom to the key convex portions 82 is applied to the bodies 60 without being applied to the connecting bolts 70.

The key main bodies 80 include side portions that are orthogonal to the lower ends of the key main bodies 80. The key convex portions 82 are disposed on the side portions of the key main bodies 80. When the key members 62 are inserted into the accommodation holes 72, the key convex portions 82 project outwardly in the radial direction from the outer circumferential surfaces of the bodies 60. The key convex portions 82 are exposed to the exterior of the bodies 60.

The key convex portions 82 extend along the axial direction of the key members 62. The key convex portions 82 are elongated along the axial direction of the key members 62. The extending direction of the key convex portions 82 is the same as the axial direction of the bodies 60. The key convex portions 82 are equipped with tapered portions 86 and convex portion main bodies 88.

The tapered portions 86 extend from roughly center portions of the key convex portions 82 to lower ends thereof along the extending direction of the key convex portions 82. The widthwise dimension of the tapered portions 86 gradually becomes smaller toward the lower ends of the key convex portions 82. The widthwise dimension is a dimension in the widthwise direction that is orthogonal to the axial direction of the key convex portions 82.

The tapered portions 86 include pairs of first and second inclined surfaces 90 and 92. The first and second inclined surfaces 90 and 92 are disposed on both sides of the key convex portions 82 in the widthwise direction orthogonal to the extending direction of the key convex portions 82.

The first inclined surfaces 90 are disposed on one of the sides in the widthwise direction of the key convex portions 82. The second inclined surfaces 92 are disposed on another of the sides in the widthwise direction of the key convex portions 82. The first inclined surfaces 90 and the second inclined surfaces 92 are symmetrical with respect to a straight line AA that passes through the center in the widthwise direction of the key convex portions 82 and the axial center P of the tools 24 (the center of rotation of the tools 24). In the widthwise direction of the key convex portions 82, the distance between the first inclined surfaces 90 and the second inclined surfaces 92 gradually becomes smaller in a direction (downwardly, in the first direction) separating away from the convex portion main bodies 88.

The first and second inclined surfaces 90 and 92 are spirally twisted along the circumferential direction of the bodies 60. When the tools 24 (the adapters 52) are viewed downwardly from the upper ends of the tapered portions 86 shown in FIG. 6A to FIG. 6C, the first inclined surfaces 90 are arranged in a counterclockwise direction (in the direction of the arrow B) with respect to the straight line AA, and the first inclined surfaces 90 are curved surfaces that are twisted clockwise with respect to the axial centers of the tools 24 downwardly from the upper ends of the tapered portions 86.

Figures 6A, 6B, 6C:
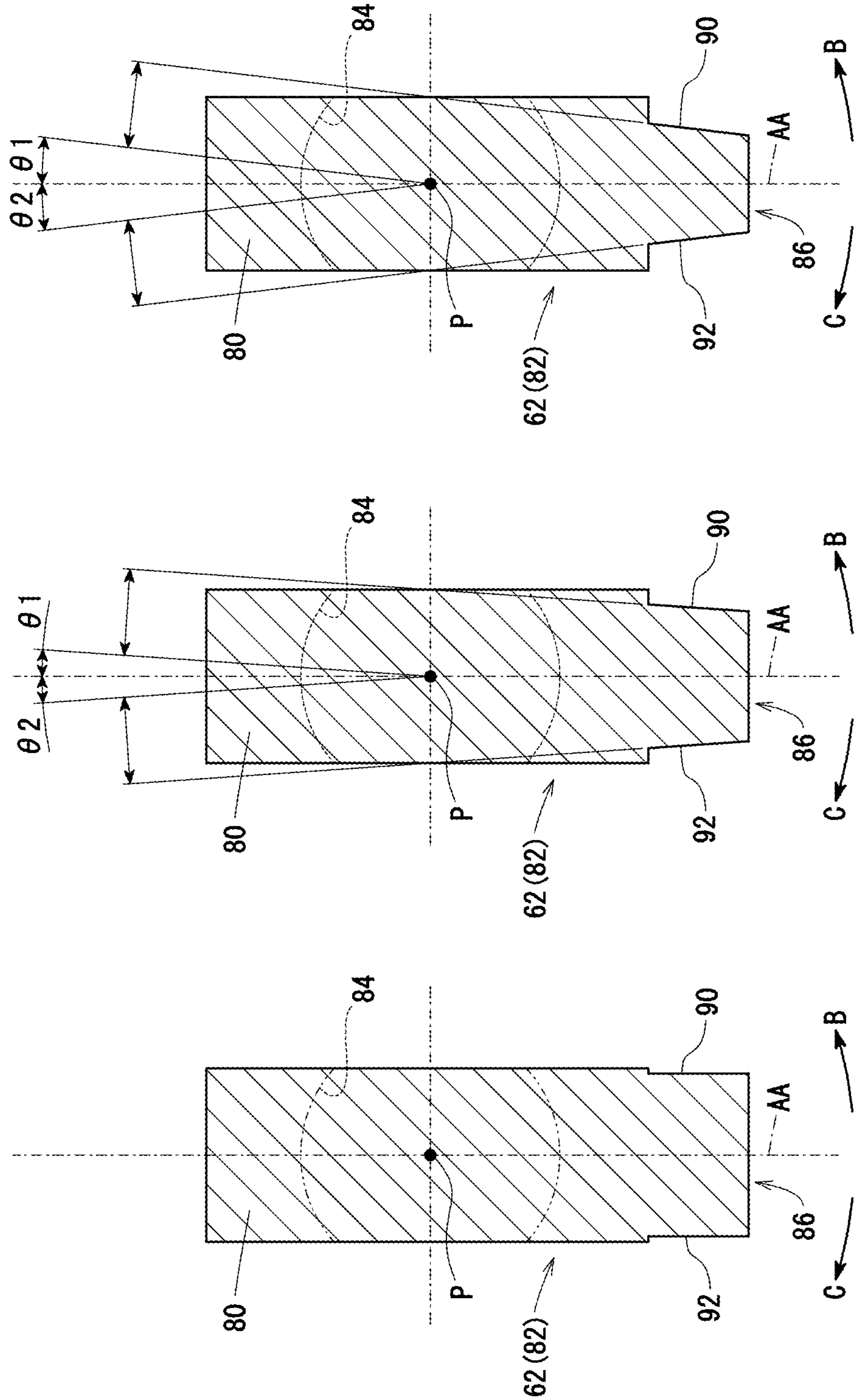
FIG. 6A is a cross-sectional view taken along line VIA-VIA of FIG. 4.
FIG. 6B is a cross-sectional view taken along line VIB-VIB of FIG. 4.
FIG. 6C is a cross-sectional view taken along line VIC-VIC of FIG. 4.

When the tools 24 (the adapters 52) are viewed downwardly from the upper ends of the tapered portions 86 shown in FIG. 6A to FIG. 6C, the second inclined surfaces 92 are arranged in a clockwise direction (in the direction of the arrow C) with respect to the straight line AA. The second inclined surfaces 92 are curved surfaces that are twisted counterclockwise with respect to the axial centers of the tools 24 (the adapters 52) downwardly from the upper ends of the tapered portions 86.

When the key members 62 shown in FIG. 6A to FIG. 6C are viewed from above, and when the angle between the straight line AA and the first inclined surfaces 90 is defined as an angle of inclination θ1, the angle of inclination θ1 of the first inclined surfaces 90 gradually becomes larger from the upper ends toward the lower ends of the key convex portions 82. As shown in FIG. 6A, at the upper ends of the key convex portions 82, the first inclined surfaces 90 are parallel to the straight line AA.

When the tools 24 (the adapters 52) are viewed downwardly from the upper ends of the tapered portions 86 shown in FIG. 6A to FIG. 6C, the second inclined surfaces 92 are curved surfaces that are twisted counterclockwise with respect to the axial centers of the tools 24. When the key members 62 are viewed from above, and when the angle between the straight line AA and the second inclined surfaces 92 is defined as an angle of inclination θ2, the angle of inclination θ2 of the second inclined surfaces 92 gradually becomes larger from the upper ends toward the lower ends of the key convex portions 82. As shown in FIG. 6A, at the upper ends of the key convex portions 82, the second inclined surfaces 92 are parallel to the straight line AA.

In the tapered portions 86, the direction in which the first inclined surfaces 90 are twisted and the direction in which the second inclined surfaces 92 are twisted are opposite to each other. The angle of inclination θ1 and the angle of inclination θ2 are the same in the extending direction of the key convex portions 82.

When viewed from above in the axial direction of the tools 24, the cross-sectional shape of the upper ends of the key convex portions 82 is a rectangular shape. The cross-sectional shape of the lower ends of the key convex portions 82 is a trapezoidal shape in which the radially outward sides thereof are narrower. From the upper ends toward the lower ends of the key convex portions 82, the cross-sectional shape of the key convex portions 82 gradually changes from the rectangular shape to the trapezoidal shape.

As shown in FIG. 3 to FIG. 5, the convex portion main bodies 88 are disposed on upper parts of the tapered portions 86. The convex portion main bodies 88 extend from roughly center portions of the key convex portions 82 to upper ends thereof along the extending direction of the key convex portions 82. The widthwise dimension of the convex portion main bodies 88 is approximately constant along the extending direction of the key convex portions 82. The convex portion main bodies 88 have a symmetrical shape in the widthwise direction of the convex portion main bodies 88. When viewed from above in the axial direction of the tools 24, the cross-sectional shape of the convex portion main bodies 88 is a rectangular shape.

As shown in FIG. 1 and FIG. 2, the four jigs 26 are capable of retaining the workpiece W. The jigs 26 are retained on support carriers 94. The jigs 26 are positioned at the same height as the support block 28 by a pair of the support carriers 94 in the axial direction of the main body frame 14. The support carriers 94 have an annular shape. The support carriers 94 are disposed to be capable of rotating on the outer circumference of the main body frame 14. The four jigs 26 are retained by the support carriers 94 at equal intervals in the circumferential direction of the support carriers 94. When viewed from the axial direction of the support carriers 94, the four jigs 26 are spaced apart from one another by 90 degrees.

The four jigs 26 are capable of rotating around the outer circumference of the main body frame 14 by the support carriers 94. When one jig 26 of the four jigs 26 faces toward the machining station 16, the one jig 26 faces toward the support block 28.

As shown in FIG. 1 to FIG. 3, the jigs 26 include jig main bodies 96, and first and second support portions 98 and 100. The cross-sectional shape of the jigs 26 is a U-shape in which the first and second support portions 98 and 100 and the jig main bodies 96 are substantially orthogonal to each other. The workpiece W is retained in a manner so as to be surrounded by the jig main bodies 96, and the first and second support portions 98 and 100 (refer to FIG. 1 and FIG. 2).

The jig main bodies 96 have a flat plate shape. The jig main bodies 96 face toward the main body frame 14 or the support block 28. The jig main bodies 96 have a substantially rectangular shape that is straight in the upper/lower direction.

The back surfaces of the jig main bodies 96 face toward the main body frame 14. Reference seats 102 are installed on the back surfaces of the jig main bodies 96. Connecting portions 150 of the support block 28, which will be described later, come into contact with the reference seats 102.

The first support portions 98 are disposed at lower ends of the jig main bodies 96. The second support portions 100 are disposed at upper ends of the jig main bodies 96. The first and second support portions 98 and 100 each project out in a direction orthogonal to the extending direction of the jig main bodies 96. The first and second support portions 98 and 100 each extend in a direction away from the main body frame 14. The first support portions 98 and the second support portions 100 face toward each other in the upper/lower direction.

The first support portions 98 include first support holes 104 therein. The first support holes 104 penetrate in the upper/lower direction. The first rotation support units 106 are accommodated in the first support holes 104. When the tools 24 are lowered together with the tool heads 22, second rotation support units 110 that support the tools 24 are inserted into second support holes 108. The second rotation support units 110 are retained by the second support holes 108 of the second support portions 100.

Figure 7:
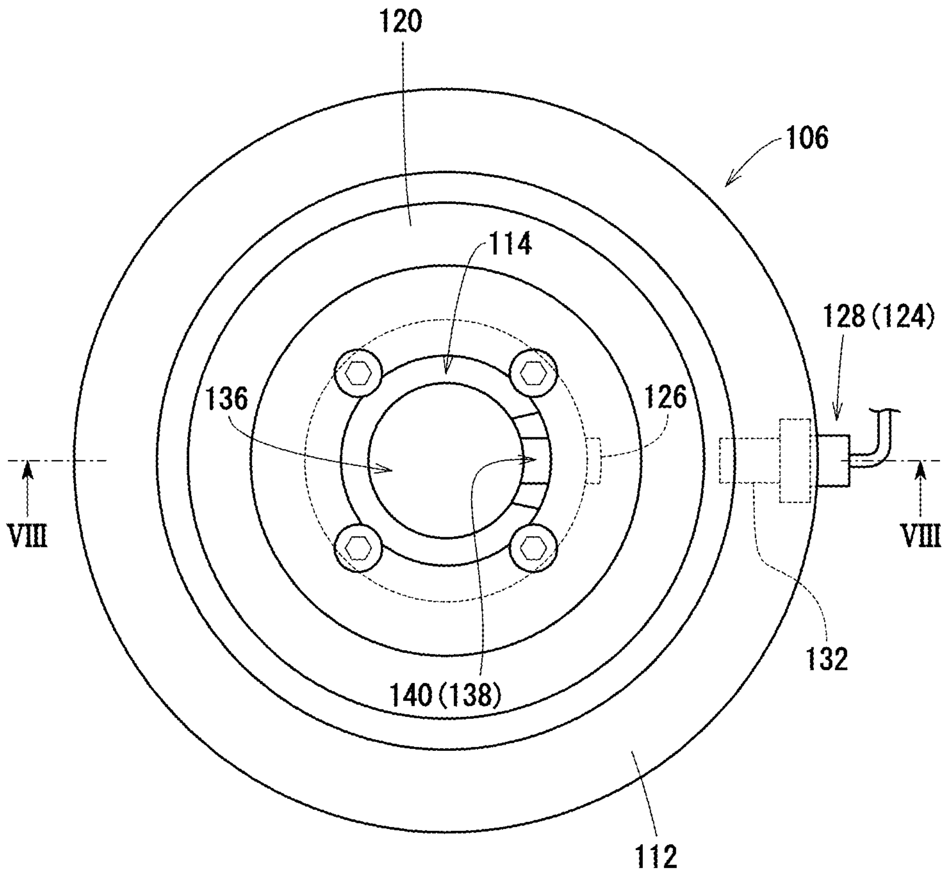
FIG. 7 is a top view of the first rotation support unit shown in FIG. 2.
Figure 8:
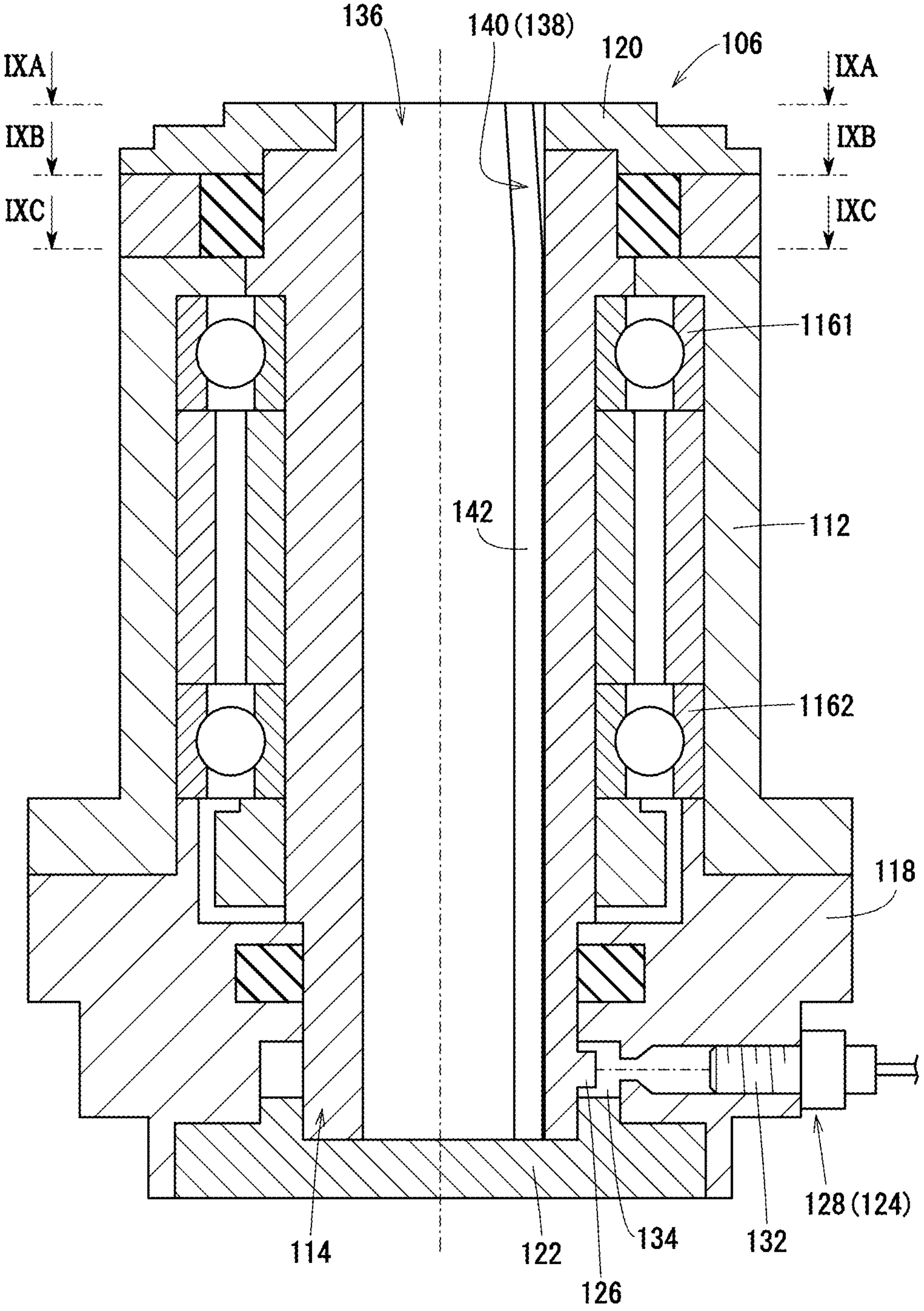
FIG. 8 is a cross-sectional view taken along line VIII-VIII of FIG. 7.

As shown in FIG. 7 and FIG. 8, the first rotation support units 106 are equipped with housings 112, bushes (rotating bodies) 114, pairs of bearings 1161 and 1162, holders 118, first and second caps 120 and 122, and detection mechanisms 124. The housings 112 have a cylindrical shape. The housings 112 are inserted into and retained in the first support holes 104 of the first support portions 98. Axial lines of the housings 112 extend in the upper/lower direction. The holders 118 are connected to lower ends of the housings 112.

The bushes 114 are cylindrical bodies. The bushes 114 are accommodated in the interior of the housings 112 and the holders 118. The bushes 114 are disposed coaxially with the housings 112. The pairs of bearings 1161 and 1162 are disposed between the bushes 114 and the housings 112. The pairs of bearings 1161 and 1162 are separated apart from each other in the axial direction of the bushes 114 and the housings 112. The bushes 114 are supported to be capable of rotating in the housings 112 by the pairs of bearings 1161 and 1162.

The first caps 120 are mounted on upper ends of the housings 112 and the bushes 114. The upper ends of the bushes 114 penetrate through the first caps 120. The upper ends of the bushes 114 are exposed to the exterior. The second caps 122 are mounted via the holders 118 on lower ends of the housings 112. The second caps 122 cover the lower ends of the bushes 114. The first and second caps 120 and 122 are capable of rotating together with the bushes 114.

The detection mechanisms 124 are equipped with detectable portions 126, air supply members 128, and a detection sensor 130 (refer to FIG. 2). The detectable portions 126 are disposed on outer circumferential surfaces of the bushes 114. The detectable portions 126 are disposed in close proximity to the lower ends of the bushes 114. The detectable portions 126 project out in a radial direction from the outer circumferential surfaces of the bushes 114. The detectable portions 126 have a predetermined width in the direction of rotation of the bushes 114.

The air supply members 128 are installed in the holders 118. The air supply members 128 are installed inwardly in the radial direction from the outer circumferential surfaces of the holders 118. Compressed air is supplied to the air supply members 128 from a non-illustrated air supply source. Distal ends of the air supply members 128 include nozzle portions 132 that are capable of spraying the air. The nozzle portions 132 are installed inside spaces 134 of the holders 118. The nozzle portions 132 and the lower ends of the bushes 114 face toward each other with the spaces 134 interposed therebetween. The compressed air is sprayed from the nozzle portions 132 of the air supply members 128 toward the outer circumferential surfaces of the bushes 114.

The detection sensor 130 is disposed on the later-described support block 28. The detection sensor 130 is an air gap sensor. A pressure difference of the compressed air that is sprayed from the air supply members 128 toward the outer circumferential surfaces of the bushes 114 is detected by the detection sensor 130. By the pressure difference detected by the detection sensor 130, it is possible to detect changes in the distance between the outer circumferential surfaces of the bushes 114 and the nozzle portions 132 of the air supply members 128.

When the bushes 114 are rotated and the detectable portions 126 face toward the air supply members 128, the distance between the detectable portions 126 and the air supply members 128 becomes smaller, thereby bringing about a change in pressure. Based on such a change in pressure, the positions of the detectable portions 126 facing toward the air supply members 128 along the direction of rotation of the bushes 114 are detected. By detecting the positions in the direction of rotation of the bushes 114, the positions of the key grooves 138 of the bushes 114 can be confirmed. When the detectable portions 126 and the air supply members 128 face toward each other, the positions of the key convex portions 82 of the tools 24 and the key grooves 138 of the bushes 114 in the direction of rotation coincide with each other.

Insertion holes 136 are included in the interior of the bushes 114. The insertion holes 136 extend along the axial direction of the bushes 114. The insertion holes 136 penetrate through the bushes 114 in the axial direction.

The tools 24 (the adapters 52) are inserted into the insertion holes 136 from the upper ends of the insertion holes 136. The insertion holes 136 have a constant diameter along the axial direction. When viewed from the axial direction of the bushes 114, the inner circumferential surfaces of the insertion holes 136 have a circular shape. The inner circumferential diameter of the insertion holes 136 has a size that enables the tools 24 to be inserted into the insertion holes 136.

The insertion holes 136 are equipped with the key grooves (engagement grooves) 138. The key grooves 138 are recessed radially outward from the inner circumferential surfaces of the insertion holes 136. The key grooves 138 extend along the axial direction of the insertion holes 136. When the distal ends of the tools 24 are inserted into the insertion holes 136, the key convex portions 82 of the key members 62 are inserted into the key grooves 138.

Figures 9A, 9B, 9C:
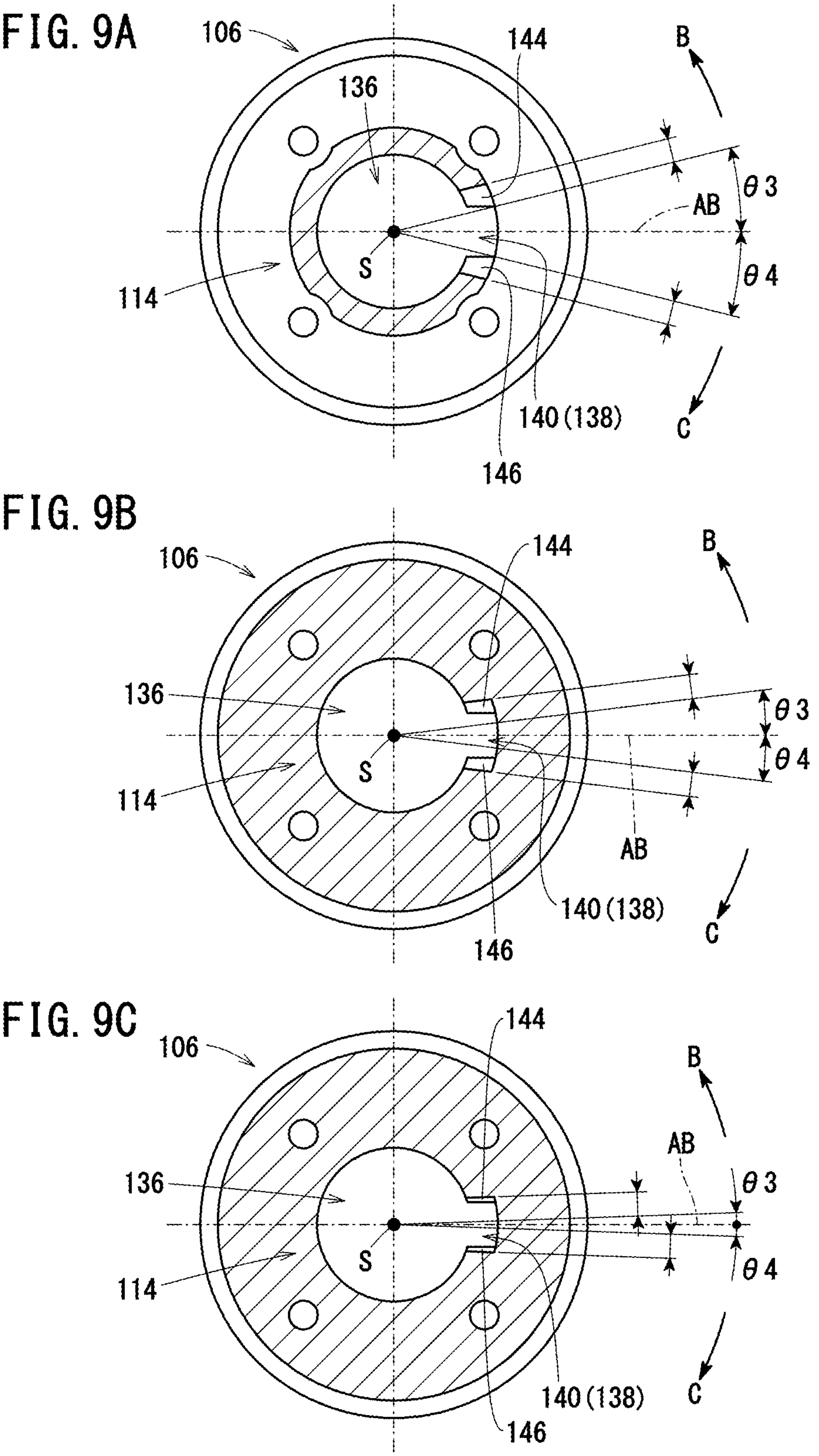
FIG. 9A is a cross-sectional view taken along line IXA-IXA of FIG. 8.
FIG. 9B is a cross-sectional view taken along line IXB-IXB of FIG. 8.
FIG. 9C is a cross-sectional view taken along line IXC-IXC of FIG. 8.
Figure 10:
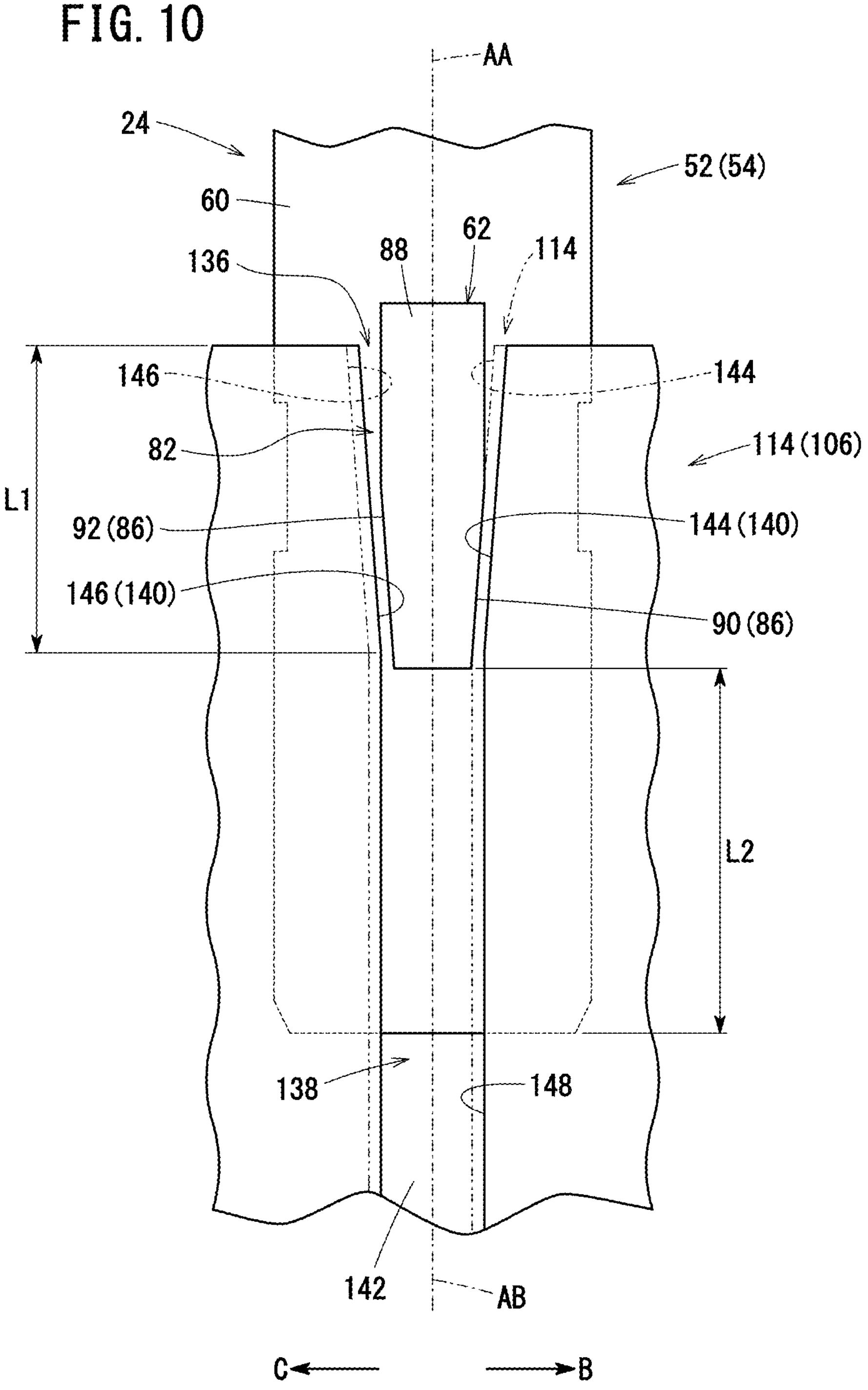
FIG. 10 is a conceptual diagram showing a state in which the distal end of the tool is inserted into a key groove of the first rotation support unit.

As shown in FIG. 8 to FIG. 10, the key grooves 138 include tapered groove portions 140 and groove main bodies 142.

The tapered groove portions 140 are disposed at upper parts of the key grooves 138. The tapered groove portions 140 include pairs of first and second guide surfaces 144 and 146. The first and second guide surfaces 144 and 146 are disposed in the widthwise direction of the key grooves 138 orthogonal to the extending direction of the key grooves 138. The first guide surfaces 144 and the second guide surfaces 146 are spaced apart from each other by a predetermined distance in the widthwise direction of the key grooves 138. The widthwise dimension of the tapered groove portions 140 is larger than the widthwise dimension of the tapered portions 86 of the key members 62.

In FIG. 9A to FIG. 9C, a straight line AB passes through the central axis S of the bushes 114 (the center of rotation of the bushes 114) and the center in the widthwise direction of the key grooves 138. When the insertion holes 136 are viewed downwardly, the first guide surfaces 144 are disposed in a counterclockwise direction with respect to the straight line AB (in the direction of the arrow B, to one side in the widthwise direction of the key grooves 138). When the insertion holes 136 are viewed downwardly, the second guide surfaces 146 are disposed in a clockwise direction with respect to the straight line AB (in the direction of the arrow C, to another side in the widthwise direction of the key grooves 138).

The first guide surfaces 144 and the second guide surfaces 146 face toward each other. The first guide surfaces 144 and the second guide surfaces 146 are symmetrical with respect to the straight line AB. The widthwise dimension of the tapered groove portions 140 gradually becomes smaller toward the lower ends of the key convex portions 82. More specifically, in the widthwise direction of the key grooves 138, the distance between the first guide surfaces 144 and the second guide surfaces 146 gradually becomes smaller from the upper ends of the tapered groove portions 140 toward the groove main bodies 142.

As shown in FIG. 9A to FIG. 9C, when viewed from above in the axial direction of the bushes 114, the first guide surfaces 144 are curved surfaces that are twisted in a manner so as to rotate clockwise (in the direction of the arrow C) with respect to the axial centers of the insertion holes 136. When the bushes 114 are viewed from above, the angle between the straight line AB and the first guide surfaces 144 is defined as an angle of inclination θ3, and the angle of inclination θ3 of the first guide surfaces 144 gradually becomes smaller from the upper ends of the tapered groove portions 140 toward the groove main bodies 142. More specifically, the angle of inclination θ3 is largest at the upper ends of the first guide surfaces 144. At the lower ends of the first guide surfaces 144, the first guide surfaces 144 are parallel to the straight line AB.

As shown in FIG. 9A to FIG. 9C, when viewed from above in the axial direction of the bushes 114, the second guide surfaces 146 are curved surfaces that are twisted in a manner so as to rotate counterclockwise with respect to the axial centers of the insertion holes 136. When the bushes 114 are viewed from above, the angle between the straight line AB and the second guide surfaces 146 is defined as an angle of inclination θ4, and the angle of inclination θ4 of the second guide surfaces 146 gradually becomes smaller from the upper ends of the tapered groove portions 140 toward the groove main bodies 142. More specifically, the angle of inclination θ4 is largest at the upper ends of the second guide surfaces 146. At the lower ends of the second guide surfaces 146, the second guide surfaces 146 are parallel to the straight line AB.

The twisted direction (the direction of inclination) of the first guide surfaces 144 and the twisted direction (the direction of inclination) of the second guide surfaces 146 are opposite to each other. The angle of inclination θ3 and the angle of inclination θ4 are the same in the extending direction of the bushes 114. When viewed from above in the axial direction of the bushes 114, the cross-sectional shape of the upper ends of the tapered groove portions 140 is a trapezoidal shape in which the radially outward sides thereof are wider. More specifically, at the upper ends of the tapered groove portions 140, the distance between the first guide surfaces 144 and the second guide surfaces 146 becomes narrower toward the inner sides in the radial direction of the bushes 114. The cross-sectional shape of the lower ends of the tapered groove portions 140 is a substantially rectangular shape. More specifically, at the lower ends of the tapered groove portions 140, the first guide surfaces 144 and the second guide surfaces 146 are parallel to each other. From the upper ends to the lower ends of the tapered groove portions 140, the cross-sectional shape of the tapered groove portions 140 gradually changes from the trapezoidal shape to the substantially rectangular shape.

The groove main bodies 142 are disposed at the lower parts of the tapered groove portions 140. The groove main bodies 142 extend from the lower ends of the tapered groove portions 140 to the lower ends of the key grooves 138 in the extending direction of the key grooves 138. The widthwise dimension of the groove main bodies 142 is constant along the extending direction of the key convex portions 82. The groove main bodies 142 include pairs of third guide surfaces 148. The widthwise dimension of the groove main bodies 142 has a size that enables the tapered portions 86 of the key members 62 to be inserted therein. The widthwise dimension of the groove main bodies 142 is slightly larger than the widthwise dimension of the key main bodies 80. The cross-sectional shape of the groove main bodies 142 is a rectangular shape.

When the tools 24 are lowered together with the tool heads 22, the lower ends of the tools 24 and the adapters 52 are inserted into the insertion holes 136 of the first rotation support units 106. At this time, the key convex portions 82 of the key members 62 are inserted into the key grooves 138.

When the key main bodies 80 of the key convex portions 82 are inserted into the tapered groove portions 140 of the key grooves 138, the first inclined surfaces 90 and the first guide surfaces 144 face toward each other. When the convex portion main bodies 88 of the key convex portions 82 are inserted into the tapered groove portions 140 of the key grooves 138, the second inclined surfaces 92 and the second guide surfaces 146 face toward each other. The first inclined surfaces 90 and the first guide surfaces 144, or alternatively, the second inclined surfaces 92 and the second guide surfaces 146 are placed mutually in surface contact with each other.

The convex portion main bodies 88 of the key members 62 are guided downward along the tapered groove portions 140 of the key grooves 138. The key convex portions 82 of the key members 62 are guided into the groove main bodies 142 of the key grooves 138. At this time, by the tapered portions 86 being guided along the groove main bodies 142, the key members 62 and the key grooves 138 are positioned relative to each other in the direction of rotation of the first rotation support units 106. In accordance with this feature, the bushes 114 of the first rotation support units 106 and the tools 24 are positioned relative to each other in the direction of rotation of the tools 24. The lower ends of the tools 24 are supported to be capable of rotating by the bushes 114 of the first rotation support units 106.

As shown in FIG. 1 and FIG. 2, the support block 28 is accommodated in the accommodation space 36 of the main body frame 14 (refer to FIG. 1). The support block 28 is exposed to the exterior of the main body frame 14 through the opening of the accommodation space 36. When the four jigs 26 are rotated together with the support carriers 94, one jig 26 of the four jigs 26 faces toward the support block 28. The one jig 26 that faces toward the support block 28 is capable of being retained by the support block 28.

The support block 28 includes a plurality of the connecting portions 150. When the support block 28 and the jigs 26 face toward each other, the connecting portions 150 and the reference seats 102 of the jigs 26 are capable of being connected to each other. Consequently, the support block 28 and the jigs 26 are positioned at predetermined positions and are connected to each other.

As shown in FIG. 1, the transport mechanism 30 is disposed on the second base 34 of the foundation 12. The transport mechanism 30 faces toward the machining station 16. The transport mechanism 30 is equipped with a movable platform 152, a cylinder 154, a workpiece retaining body 156, a pallet 158, and a pallet retaining portion 160.

The movable platform 152 is disposed horizontally on the upper part of the second base 34. The movable platform 152 is capable of moving along the second base 34 in directions toward or away from the main body frame 14. The cylinder 154 biases the movable platform 152 in the directions toward or away from the main body frame 14. The workpiece retaining body 156 is retained by the movable platform 152. The workpiece retaining body 156 extends along the direction of movement of the movable platform 152. The pallet retaining portion 160 is installed on an end part of the workpiece retaining body 156.

The pallet retaining portion 160 faces toward the machining station 16 and the main body frame 14. The pallet retaining portion 160 is a plate-shaped body that is orthogonal to the axial direction of the workpiece retaining body 156. The pallet retaining portion 160 is orthogonal to the direction of movement of the movable platform 152. The pallet retaining portion 160 is capable of retaining the workpiece W via the pallet 158.

By causing the movable platform 152 to be moved by the cylinder 154, the workpiece W that is retained on the pallet 158 can be brought closer in proximity to or separated away from the machining station 16.

Next, a description will be given concerning the operations of the cutting machine 10.

First, at a position in which the movable platform 152 of the transport mechanism 30 is separated away from the main body frame 14, the workpiece W is retained on the pallet 158. The cylinder 154 is driven, and thereby causes the movable platform 152 to be moved toward the main body frame 14 together with the workpiece retaining body 156. In accordance with this feature, the workpiece W reaches the machining station 16, and the workpiece W is retained by the jig 26. By causing the support carriers 94 to be rotated, the workpieces W are retained respectively by the four jigs 26.

Next, the jig 26 is disposed in a position facing toward the support block 28, and the support block 28 is delivered out toward the jig 26. The connecting portions 150 of the support block 28 and the reference seats 102 of the jig 26 come into contact with each other. The jig 26 and the support block 28 are positioned relative to each other. Consequently, the jig 26 is retained on the support block 28.

Next, by driving the lifting motor 44 of the feed mechanism 20, the drive mechanism 18 and the tool head 22 are lowered toward the workpiece W. Consequently, the tools 24 are lowered together with the tool head 22. Accompanying the lowering of the tools 24, the second rotation support units 110 are inserted into the second support holes 108 of the second support portions 100, and thereafter, the tools 24 are inserted into the machined holes H of the workpiece W (refer to FIG. 2). Accompanying further lowering of the tools 24, the adapters 52 are inserted into the insertion holes 136 of the bushes 114 in the first rotation support units 106.

At this time, in the direction of rotation of the tools 24, the positions of the key convex portions 82 of the key members 62, and the key grooves 138 of the insertion holes 136 basically and substantially coincide with each other. More specifically, the positions of the key convex portions 82 and the key grooves 138 in the direction of rotation of the tools 24 become such that the key convex portions 82 are capable of being inserted into the key grooves 138. After the workpiece W has been subjected to machining by the tools 24, then when the tools 24 are raised and withdrawn upwardly from the insertion holes 136 of the bushes 114, the positional relationship between the key convex portions 82 of the key members 62 and the key grooves 138 of the insertion holes 136 basically does not change. The positional relationship between the key convex portions 82 of the key members 62 and the key grooves 138 of the insertion holes 136 is maintained, and when the next workpiece W is subjected to machining, then accompanying the lowering of the tools 24, the key convex portions 82 of the key members 62 are inserted into the key grooves 138 in the insertion holes 136.

As shown in FIG. 10, if the axial length along the axial direction of the tapered groove portions 140 of the insertion holes 136 that are formed in the bushes 114 is denoted by L1, and the axial length along the axial direction from the lower ends of the key convex portions 82 of the key members 62 in the tools 24 to the lower ends of the tools 24 is denoted by L2, then the axial length L2 is longer than the axial length L1 of the tapered groove portions 140 (L2>L1). Therefore, by the tools 24 being inserted into the insertion holes 136, the axes of the insertion holes 136 and the axes of the tools 24 coincide with each other.

Accompanying the adapters 52 being inserted into the insertion holes 136, the tapered portions 86 of the key convex portions 82 of the key members 62 are inserted into the tapered groove portions 140 of the key grooves 138. At this time, as shown in FIG. 10, in the case that the key convex portions 82 and the key grooves 138 are slightly misaligned in the direction of rotation of the tools 24, then when the distal ends of the tapered portions 86 are inserted into the upper ends of the tapered groove portions 140, the first inclined surfaces 90 of the tapered portions 86 come into contact with the first guide surfaces 144 of the tapered groove portions 140, or the second inclined surfaces 92 of the tapered portions 86 come into contact with the second guide surfaces 146 of the tapered groove portions 140.

More specifically, when viewed from above in the axial direction of the tools 24, in the case that the bushes 114 are misaligned in a clockwise direction (the direction of the arrow C in FIG. 6A to FIG. 6C, and FIG. 9A to FIG. 9C) with respect to the tools 24, the first inclined surfaces 90 of the key convex portions 82 and the first guide surfaces 144 of the key grooves 138 come into surface contact with each other. When viewed from above in the axial direction of the tools 24, in the case that the bushes 114 are misaligned in a counterclockwise direction (the direction of the arrow B in FIG. 6A to FIG. 6C, and FIG. 9A to FIG. 9C) with respect to the tools 24, the second inclined surfaces 92 of the key convex portions 82 and the second guide surfaces 146 of the key grooves 138 come into surface contact with each other. Hereinafter, as indicated by the two-dot dashed line in FIG. 10, a description will be given concerning a case in which the first inclined surfaces 90 and the first guide surfaces 144 come into contact with each other.

When the tools 24 are further lowered, accompanying the first inclined surfaces 90 and the first guide surfaces 144 coming into contact with each other, the first guide surfaces 144 of the bushes 114 move along the first inclined surfaces 90. At this time, since the first guide surfaces 144 and the first inclined surfaces 90 are in surface contact with each other, the first guide surfaces 144 are stably guided along the first inclined surfaces 90. Consequently, when viewed from above in the axial direction of the tools 24, the bushes 114 rotate counterclockwise (in the direction of the arrow B) so as to follow along with the tools 24. By the bushes 114 rotating in the interior of the housings 112, the centers in the widthwise direction of the key grooves 138 approach the centers in the widthwise direction of the key convex portions 82.

Then, the bushes 114 rotate further by the tapered portions 86 of the tools 24 descending along the tapered groove portions 140 of the key grooves 138. When the upper ends of the tapered portions 86 of the key convex portions 82 reach the lower ends of the tapered groove portions 140 of the key grooves 138, the centers in the widthwise direction of the key convex portions 82 and the centers in the widthwise direction of the key grooves 138 substantially coincide with each other. In accordance with this feature, the positions along the direction of rotation of the tools 24 including the key convex portions 82, and the positions along the direction of rotation of the bushes 114 (the first rotation support units 106) including the key grooves 138 substantially coincide with each other. Specifically, the phases of the tools 24 and the bushes 114 in the direction of rotation substantially coincide with each other.

When the tools 24 are lowered further, the tapered portions 86 of the key convex portions 82 move into the groove main bodies 142 of the key grooves 138. The convex portion main bodies 88 are guided downwardly along the groove main bodies 142. Consequently, the convex portion main bodies 88 and the groove main bodies 142 are engaged with each other, and the phases of the tools 24 and the bushes 114 in the direction of rotation substantially coincide with each other. Relative rotation between the tools 24 and the bushes 114 is restricted.

As a result, by the key convex portions 82 being engaged with the key grooves 138, the tools 24 and the bushes 114 are capable of rotating together in an integral manner. In accordance with this feature, the lower ends of the tools 24 are supported to be capable of rotating by the bushes 114 of the first rotation support units 106, and the vicinity of the upper ends of the tools 24 are supported to be capable of rotating by the second rotation support units 110.

Moreover, when the key convex portions 82 are inserted into the key grooves 138 and the second inclined surfaces 92 and the second guide surfaces 146 come into contact with each other, then accompanying the contact between the second inclined surfaces 92 and the second guide surfaces 146, the bushes 114 rotate clockwise (in the direction of the arrow C) so as to follow along with the tools 24. At this time, since the second guide surfaces 146 and the second inclined surfaces 92 are in surface contact with each other, the second guide surfaces 146 are stably guided along the second inclined surfaces 92. By the bushes 114 being rotated, the centers in the widthwise direction of the key grooves 138 and the centers in the widthwise direction of the key convex portions 82 coincide with each other, and the phases of the tools 24 and the bushes 114 in the direction of rotation substantially coincide with each other.

Next, the workpiece W is caused to move slightly in the horizontal direction by the transport mechanism 30, and the axial lines of the machined holes H of the workpiece W and the axial lines of the tools 24 are made to coincide. The drive motor 42 is driven, and the tools 24 are further lowered while being made to rotate. Consequently, the inner circumferential surfaces of the machined holes H are cut by the bits 50 which rotate together with the tools 24. The inner circumferential surfaces of the machined holes H in the workpiece W are machined to a desired inner circumferential diameter.

At this time, the lower ends and the upper ends of the tools 24 along the extending direction of the tools 24 are supported to be capable of rotating by the jig 26 via the first and second rotation support units 106 and 110. Therefore, when the workpiece W is machined by the tools 24, the tools 24 are prevented from being pressed and deformed by a reaction force applied from the workpiece W to the tools 24.

When machining is to be carried out on machined holes H of another workpiece W that is retained by the support carriers 94, at first, the tools 24 are raised by the drive mechanism 18 and caused to separate away from the workpiece W, and thereafter, the connection between the jig 26 that retains the workpiece W on which machining has been completed and the support block 28 is released. Next, the support carriers 94 are rotated, and the jig 26 on which the next workpiece W is retained is made to face toward the support block 28. In addition, the support block 28 is delivered out toward the jig 26, and after the jig 26 and the support block 28 have been positioned at predetermined positions, the tool head 22 is lowered, and machining of the machined holes H of the workpiece W is carried out by the tools 24.

As noted previously, in the embodiment of the present invention, there are provided the tools 24 that are driven to rotate and thereby are capable of machining the workpiece W, and the first rotation support units 106 including the bushes 114 provided with the insertion holes 136 into which the distal ends of the tools 24 are inserted. The distal ends of the tools 24 are equipped with the key members 62 in which the key convex portions 82 are included. In the insertion holes 136 of the bushes 114, there are provided the key grooves 138 that are recessed outwardly in the radial direction from the inner circumferential surfaces of the insertion holes 136. The key convex portions 82 of the key members 62 are capable of being inserted into the key grooves 138. The key convex portions 82 are equipped with the tapered portions 86. The tapered portions 86 include the first and second inclined surfaces 90 and 92, the distance between which becomes smaller downwardly.

When the tools 24 are viewed downwardly, the first inclined surfaces 90 are disposed in a counterclockwise direction with respect to the center in the widthwise direction of the tapered portions 86. The first inclined surfaces 90 are curved surfaces that are twisted downward and clockwise with respect to the axial centers of the tools 24. When the tools 24 are viewed downwardly, the second inclined surfaces 92 are disposed in a clockwise direction with respect to the center in the widthwise direction of the tapered portions 86. The second inclined surfaces 92 are curved surfaces that are twisted downward and counterclockwise with respect to the axial centers of the tools 24.

The key grooves 138 are equipped with the tapered groove portions 140 including the first and second guide surfaces 144 and 146, the distance between which becomes smaller downwardly. When the insertion holes 136 are viewed downwardly, the first guide surfaces 144 are disposed in a counterclockwise direction with respect to the center in the widthwise direction of the key grooves 138, and the second guide surfaces 146 are disposed in a clockwise direction with respect to the center in the widthwise direction of the key grooves 138. The first guide surfaces 144 are curved surfaces that are twisted downward and clockwise with respect to the axial centers of the insertion holes 136. The second guide surfaces 146 are curved surfaces that are twisted downward and counterclockwise with respect to the axial centers of the insertion holes 136.

When machining of the workpiece W is carried out by the tools 24 in the cutting machine 10, the tools 24 are lowered along the main body frame 14, and the distal ends of the tools 24 are inserted into the insertion holes 136 of the bushes 114 in the first rotation support units 106. When the key convex portions 82 of the key members 62 are inserted into the key grooves 138 of the insertion holes 136, either the first inclined surfaces 90 and the first guide surfaces 144, or alternatively, the second inclined surfaces 92 and the second guide surfaces 146 are placed mutually in surface contact with each other. Consequently, the tools 24 are further lowered while either the first inclined surfaces 90 and the first guide surfaces 144, or alternatively, the second inclined surfaces 92 and the second guide surfaces 146 are mutually in surface contact with each other.

As a result, the bushes 114 rotate in following relation with the tools 24, in a manner so that the centers in the widthwise direction of the key grooves 138 face toward the centers in the widthwise direction of the key convex portions 82. By the centers in the widthwise direction of the key grooves 138 and the centers in the widthwise direction of the key members 62 substantially coinciding with each other, the key main bodies 80 of the key members 62 can be inserted into the groove main bodies 142 of the key grooves 138, and the phases of the tools 24 and the bushes 114 in the direction of rotation can be made to substantially coincide with each other.

Accordingly, by lowering the distal ends of the tools 24 and inserting the distal ends into the insertion holes 136 of the bushes 114 in the first rotation support units 106, and causing the key convex portions 82 of the key members 62 to engage with the key grooves 138, the phases of the tools 24 and the bushes 114 in the direction of rotation can be easily and reliably aligned. As a result, when the tools 24 are rotated and machining of the workpiece W is carried out, the tools 24 can be supported to be capable of rotating by the bushes 114.

In comparison with a case in which the tools 24 are lowered and the distal ends of the tools 24 are inserted into the insertion holes 136 of the first rotation support units 106, and thereafter, the tools 24 are rotated to cause the phases of the tools 24 and the bushes 114 to be made to coincide, the phases can be aligned simply by inserting the tools 24 into the insertion holes 136.

Therefore, the operation time period required to machine the workpiece W with the cutting machine 10 can be shortened. Since the key members 62 are fixed to the distal ends of the tool shafts 25, an operational malfunction does not occur due to chips generated by the cutting machine 10, and the key members 62 can always be inserted stably into the key grooves 138. Consequently, the phases of the tools 24 and the bushes 114 in the direction of rotation can be aligned.

The detection mechanisms 124 are provided that detect the positions in the direction of rotation of the bushes 114 of the first rotation support units 106. By detecting, by the detection mechanisms 124, the positions in the direction of rotation of the bushes 114, the positions in the direction of rotation of the key grooves 138 can be detected. In accordance with this feature, in the directions of rotation of the tools 24 and the bushes 114, it becomes possible to confirm whether or not the positions of the key convex portions 82 and the positions of the key grooves 138 coincide with each other to an extent to which the key convex portions 82 are capable of being inserted into the key grooves 138. If for some reason, in the case that the positions of the key grooves 138 in the direction of rotation of the bushes 114 are not at appropriate positions (in the case that the positions in the direction of rotation of the bushes 114 are such that the key convex portions 82 cannot be inserted into the key grooves 138), an alarm to such an effect is notified to the user.

The detection mechanisms 124 are equipped with the detectable portions 126 that are disposed on the outer circumference of the bushes 114 and that project outwardly in the radial direction, and the detection sensor 130 that is capable of detecting the detectable portions 126. The pressure difference of the compressed air that is sprayed from the air supply members 128 toward the detectable portions 126 is detected by the detection sensor 130. Based on such a pressure difference, the positions of the detectable portions 126 facing toward the air supply members 128 along the direction of rotation of the bushes 114 are detected. By detecting the positions in the direction of rotation of the bushes 114, the positions of the key grooves 138 of the bushes 114 can be confirmed.

The adapters 52 including the key members 62 are disposed in an attachable and detachable manner on the distal ends of the tools 24. Therefore, the key members 62 can be easily replaced with respect to the tools 24, depending on the type or the application of the tools 24.

The upper ends of the tools 24 are connected to the drive mechanism 18 that causes the tools 24 to be driven to rotate, and the upper ends are supported to be capable of rotating via the second rotation support units 110 that are arranged on the main body frame 14. In accordance with this feature, both ends of the tools 24 are supported to be capable of rotating by the first and second rotation support units 106 and 110. Therefore, when machining of the workpiece W is carried out with the tools 24, even if a reaction force from the workpiece W is applied to the tools 24, warping (deformation) of the tools 24 is suppressed.

The above-described embodiment can be summarized as follows.

The above-described embodiment is characterized by the cutting machine (10), comprising: the main body frame (14); the tool (24) that has a shaft shape, is linearly movably disposed along the main body frame, and is driven to rotate; and the rotation support unit (106) including the rotating body (114) provided with the insertion hole (136) into which the distal end part of the tool along the direction of movement is inserted, wherein the rotating body is capable of rotating together with the tool that is inserted into the insertion hole, wherein the tool is inserted into the insertion hole by moving in the first direction along the axial direction of the tool, the engaging convex portion (82), which projects outwardly in the radial direction of the tool and extends along the axial direction of the tool, is provided on the distal end part of the tool, the insertion hole extends along the axial direction of the rotating body, and includes the engagement groove (138) that is recessed from the inner circumferential surface of the insertion hole and outwardly in the radial direction of the insertion hole, the engaging convex portion being inserted into the engagement groove, the engaging convex portion includes: the convex portion main body (88) formed with a substantially constant width along the axial direction of the tool; and the tapered portion (86) disposed adjacent to the convex portion main body in the first direction and including the first and second inclined surfaces (90, 92), the distance between which becomes smaller toward the first direction, when the tool is viewed in the first direction, the first inclined surface (90) is disposed in a counterclockwise direction with respect to the center in the widthwise direction of the tapered portion, and the second inclined surface (92) is disposed in a clockwise direction with respect to the center in the widthwise direction of the tapered portion, the first inclined surface is a surface that is twisted clockwise with respect to the axial center of the tool toward the first direction, and the second inclined surface is a surface that is twisted counterclockwise with respect to the axial center of the tool toward the first direction, the rotating body includes the end surface facing toward the second direction which is a direction opposite to the first direction, the engagement groove includes: the tapered groove portion (140) extending in the first direction from the end surface of the rotating body and including the first and second guide surfaces (144, 146), the distance between which becomes smaller toward the first direction, the tapered groove portion having a greater width than the tapered portion; and the groove main body (142) disposed adjacent to the tapered groove portion in the first direction, and formed with a substantially constant width along the axial direction of the rotating body, when the insertion hole is viewed in the first direction, the first guide surface (144) is disposed in a counterclockwise direction with respect to the center in the widthwise direction of the engagement groove, and the second guide surface (146) is disposed in a clockwise direction with respect to the center in the widthwise direction of the engagement groove, and the first guide surface is a surface that is twisted clockwise with respect to the axial center of the insertion hole toward the first direction, and the second guide surface is a surface that is twisted counterclockwise with respect to the axial center of the insertion hole toward the first direction.

The cutting machine further comprises the detection mechanism (124) that detects the position of the rotating body in the direction of rotation.

The detection mechanism includes: the detectable portion (126) that is disposed on the outer circumference of the rotating body, and that projects outwardly in the radial direction; and the detection sensor (130) that detects the detectable portion.

The engaging convex portion is disposed in an attachable and detachable manner on the distal end part of the tool.

The tool includes the base end disposed in the opposite direction to the distal end part of the tool and connected to the drive mechanism (18) that causes the tool to be driven to rotate, and the base end is supported to be capable of rotating by the second rotation support unit (110) that is disposed on the main body frame.

Moreover, the present invention is not limited to the above-described embodiment, and various configurations can be adopted therein without departing from the essence and gist of the present invention.

REFERENCE SIGNS LIST

10: cutting machine
14: main body frame
18: drive mechanism
24: tool
52: adapter
62: key member
82: key convex portion
86: tapered portion
90: first inclined surface
92: second inclined surface
106: first rotation support unit
110: second rotation support unit
124: detection mechanism
138: key groove
140: tapered groove portion
144: first guide surface
146: second guide surface
W: workpiece

What is claim is:

1. A cutting machine, comprising:

a main body frame;

a tool that has a shaft shape, is linearly movably disposed along the main body frame, and is driven to rotate; and a rotation support unit including a rotating body provided with an insertion hole into which a distal end part of the tool along a direction of movement is inserted, wherein the rotating body is configured to rotate together with the tool that is inserted into the insertion hole, wherein the tool is inserted into the insertion hole by moving in a first direction along an axial direction of the tool, an engaging convex portion, which projects outwardly in a radial direction of the tool and extends along the axial direction of the tool, is provided on the distal end part of the tool, the insertion hole extends along an axial direction of the rotating body, and includes an engagement groove recessed from an inner circumferential surface of the insertion hole and outwardly in a radial direction of the insertion hole, the engaging convex portion being inserted into the engagement groove, the engaging convex portion includes:

a convex portion main body formed with a substantially constant width along the axial direction of the tool; and a tapered portion disposed adjacent to the convex portion main body in the first direction, and including first and second inclined surfaces, a distance between which becomes smaller toward the first direction, when the tool is viewed in the first direction, the first inclined surface is disposed in a counterclockwise direction with respect to a center in a widthwise direction of the tapered portion, and the second inclined surface is disposed in a clockwise direction with respect to the center in the widthwise direction of the tapered portion, the first inclined surface is a surface that is twisted clockwise with respect to an axial center of the tool toward the first direction, and the second inclined surface is a surface that is twisted counterclockwise with respect to the axial center of the tool toward the first direction, the rotating body includes an end surface facing toward a second direction that is a direction opposite to the first direction, the engagement groove includes:

a tapered groove portion extending in the first direction from the end surface of the rotating body and including first and second guide surfaces, a distance between which becomes smaller toward the first direction, the tapered groove portion having a greater width than the tapered portion; and a groove main body disposed adjacent to the tapered groove portion in the first direction, and formed with a substantially constant width along the axial direction of the rotating body, when the insertion hole is viewed in the first direction, the first guide surface is disposed in the counterclockwise direction with respect to a center in a widthwise direction of the engagement groove, and the second guide surface is disposed in the clockwise direction with respect to the center in the widthwise direction of the engagement groove, the first guide surface is a surface that is twisted clockwise with respect to an axial center of the insertion hole toward the first direction, and the second guide surface is a surface that is twisted counterclockwise with respect to the axial center of the insertion hole toward the first direction, and the cutting machine further comprises a detection mechanism configured to detect a position of the rotating body in a direction of rotation, and the detection mechanism includes: a detectable portion that is disposed on an outer circumference of the rotating body, and that projects outwardly in a radial direction; and a detection sensor configured to detect the detectable portion.

2. The cutting machine according to claim 1, wherein the engaging convex portion is disposed in an attachable and detachable manner on the distal end part of the tool.

3. The cutting machine according to claim 1, wherein the tool includes a base end disposed in an opposite direction to the distal end part of the tool and connected to a drive mechanism configured to cause the tool to be driven to rotate, and the base end is rotatably supported by a second rotation support unit that is disposed on the main body frame.

* * * * *